United States Patent [19]

Pollard et al.

[11] Patent Number: 4,897,875

[45] Date of Patent: Jan. 30, 1990

[54] KEY MANAGEMENT SYSTEM FOR OPEN COMMUNICATION ENVIRONMENTS

[75] Inventors: Alan J. Pollard; James R. Lemire, both of Winnipeg, Canada

[73] Assignee: The Manitoba Telephone System, Winnipeg, Canada

[21] Appl. No.: 92,625

[22] Filed: Sep. 3, 1987

Related U.S. Application Data

[63] Continuation of Ser. No. 710,429, Mar. 11, 1985, abandoned.

[30] Foreign Application Priority Data

Sep. 4, 1986 [GB] United Kingdom ................. 8621333

[51] Int. Cl.⁴ ............................................. H04L 9/02
[52] U.S. Cl. ...................................... 380/21; 380/10; 380/23; 380/25; 380/50; 380/52
[58] Field of Search ..................... 380/3, 4, 21, 23–25, 380/49, 50, 52, 5, 7, 10; 364/200, 900

[56] References Cited

U.S. PATENT DOCUMENTS

| | | | |
|---|---|---|---|
| 3,764,742 | 10/1973 | Abbott et al. | 380/23 |
| 3,798,605 | 3/1974 | Feistel | 380/25 |
| 3,806,874 | 4/1974 | Ehrat | 380/23 |
| 3,906,460 | 9/1975 | Halpern | 380/23 X |
| 4,186,871 | 2/1980 | Anderson et al. | 380/24 |
| 4,206,315 | 6/1980 | Matyas et al. | 380/23 |
| 4,211,919 | 7/1980 | Ugon | 380/23 X |
| 4,259,720 | 3/1981 | Campbell | 380/24 |
| 4,281,215 | 7/1981 | Atalla | 380/23 |
| 4,295,039 | 10/1981 | Stuckert | 380/23 X |
| 4,295,041 | 10/1981 | Ugon | 380/23 X |
| 4,310,720 | 1/1982 | Check, Jr. | 380/25 |
| 4,386,266 | 5/1983 | Chesarek | 380/25 |
| 4,430,728 | 2/1984 | Beitel et al. | 364/900 |
| 4,458,315 | 7/1984 | Uchenick | 380/4 |
| 4,630,201 | 12/1986 | White | 380/24 X |
| 4,661,658 | 4/1987 | Matyas | 380/23 |
| 4,661,980 | 4/1987 | Byram | 380/46 |
| 4,665,396 | 5/1987 | Dieleman | 380/23 |
| 4,668,103 | 5/1987 | Wilson | 380/30 |
| 4,672,533 | 6/1987 | Noble et al. | 380/25 X |
| 4,677,434 | 6/1987 | Fascenda | 380/23 |
| 4,679,236 | 7/1987 | Davies | 380/23 |
| 4,683,553 | 7/1987 | Mollier | 380/4 |
| 4,720,860 | 1/1988 | Weiss | 380/23 |
| 4,731,840 | 3/1988 | Mniszewski et al. | 380/21 |
| 4,731,841 | 3/1988 | Rosen et al. | 380/23 |
| 4,757,468 | 7/1988 | Domenik et al. | 380/4 X |
| 4,782,529 | 11/1988 | Shima | 380/50 X |

FOREIGN PATENT DOCUMENTS 0115362 8/1984 European Pat. Off. .
2062410 5/1981 United Kingdom .

OTHER PUBLICATIONS

"Nachrichtentechnische Zeitschrift", (vol. 36, No. 8; 8/83; pp. 500–504; Berlin); W. Bosch, Bildschirmtext Braucht Datensicherheit.

Primary Examiner—Stephen C. Buczinski
Assistant Examiner—Bernarr Earl Gregory
Attorney, Agent, or Firm—Adrian D. Battison; Stanley G. Ade; Murray E. Thrift

[57] ABSTRACT

A telecommunications security device for use on the communication medium includes a first and a second security unit each arranged to be inserted into for example the telephone line adjacent a user device. The units are identical and therefore either can act as a central unit for example a computer access port with the other providing one of a set of remote units. Each unit includes a separable memory module with all the modules having a memory storing identical information. The information stored includes a plurality of pairs of random signals one of each pair providing a request signal and the other the security code. The central unit on receipt of a telephone call provides a signal requesting an ID code from the remote unit and on receipt of the ID code issues from one of the pairs the security code request signal. On matching the received code with the expected code a transmission gate is opened. The pairs are used in turn until all of the pairs have been used whereupon an indicator shows this condition. The modules can be removed and the memory re-written with fresh pairs of codes. The key includes a security logic circuit which controls access to the numbers to a fixed set of access rules allowing authentication and/or encryption and providing security against unauthorized access.

22 Claims, 6 Drawing Sheets

KEY MANAGEMENT SYSTEM FOR OPEN COMMUNICATION ENVIRONMENTS

This application is a continuation-in-part of our application No. 710429 filed Mar. 11, 1985, now abandoned.

BACKGROUND OF THE INVENTION

This invention relates to a key management system for open communication environments for example the public switched telephone system, radio communications and others.

The term "key" in this specification is intended to refer to a code or number which can be used for authentication, identification, message encryption, message authentication, or digital signature.

The invention is based upon a unique approach to the handling and transfer of such numerical keys, to their use and to a memory module for storing the keys.

According to a first aspect of the invention, therefore, there is provided a security system for authenticating a potential user of a service comprising a first unit associated with the service, a second unit associated with the user, each of said first and second unit including means for communicating with the other through a communication medium, each of said first and second units including memory means, each of said memory means having stored therein a plurality of groups of random numbers, the numbers of each group being logically associated together as a group at a logical address in the memory, said random numbers of said groups and the associated addresses in the memory means of the first unit being identical to those of the memory means of the second unit, said first unit including control circuit means arranged, in a first cycle of operation to extract from the memory means thereof one of the random numbers in one of said groups at a respective address, to communicate said one random number to said second unit, to compare a received signal from the second unit with another of the random numbers in said one of said groups, and to provide authentication of said user only upon a match of said received signal with said another of the random numbers, and in each subsequent cycle of operation to extract one of the random numbers from a respective different one of the groups in the memory means, said second unit including control circuit means arranged on receipt from said first unit of said one of the random numbers in said one of said groups to extract from said memory means thereof said another of said random numbers of said group.

According to a second aspect of the invention there is provided a memory module for storing and transporting a plurality of numerical keys for use in a security system comprising a casing forming an outer protection for the module by which the module is a separate readily transportable unit, electrical connection means in said casing by which said module, can be electrically connected to said security system, a memory in said casing, means in said casing arranged to retain material in said memory when said module is separated from said security system, said memory having stored therein a plurality of groups of random numbers, the numbers of each group being logically associated together as a group at a logical address in the memory, and a logic control circuit defining a fixed set of rules which control access to the random numbers in the groups.

According to a third aspect of the invention there is provided a security system for secure information transmission comprising a first unit for transmitting information, a second unit for receiving the information, each of said first and second unit including means for communicating with the other through a communication medium, each of said first and second units including memory means, each of said memory means having stored therein a plurality of groups of random numbers, the numbers of each group being logically associated together as a group at a logical address in the memory, said random numbers of said groups and the associated addresses in the memory means of the first unit being identical to those of the memory means of the second unit, said first unit including control circuit means arranged in first cycle of operation to extract from the memory means thereof a first and a second random number from one of said groups at a respective address, to generate a concatenated message including said random number and including said information algorithmically acted upon using said second random number and to transmit said message to said second unit, and in each subsequent cycle operation to extract random numbers from a respective different one of the groups in the memory means, said second unit including control circuit means arranged on receipt from said first unit of said message including said first random number to extract from said memory means a random number from said one of said groups and to algorithmically act upon said message using said random number so extracted.

These techniques can thus be used for encryption, authentication, identification and/or digital signature. In lower levels of the security system, the memory requires to store only two random numbers associated with a particular position in the memory. In higher levels of security systems including many or all of the above, it is necessary to store in association with the particular position three random numbers in the aforementioned sets.

The invention has as an important part a technique for physical transmission of the memory in the memory module referred to hereinafter as a key transfer device (KTD) which provides security by the technique of giving an indication when the device has been read and by preventing its reversion to a normal transmission state without passing through a state in which the information is erased from the memory.

The new approach for key management described here allows encryption keys to be exchanged or transferred in any open communications environment (e.g. telephone, radio, etc.) without providing any information that an attacker could use to discover the keys. The method accommodates very rapid (less than one second) key changes any time during an established session with excellent economy and a minimum of administrative overhead.

An interesting benefit of this key management methodology is that it can be adopted to provide a form of digital signature which can be used with messages or for user authentication. When used for authentication, this digital signature exhibits the same strength against communications based attack as is provided by the key management approach and is unique in that it can automatically authenticate in both directions. A description of how this key management approach has successfully been incorporated into a commercial dial-access authentication product is included to demonstrate the practicality and future possibilities of this new methodology.

The purpose of a key management system is to provide a means of distribution and control of keys used to operate authentication, encryption and digital signature functions. Key management approaches should be designed to remain secure in a hostile telecommunications environment. Any attacker must be assumed to possess full knowledge of all hardware, software and algorithmic principles that are used as well as information from a line-tap. An attacker must be further assumed to have unlimited financial and technical resources.

Most current key management systems revolve around the protection of one master key or one master key pair using a combination of physical, algorithmic, procedural and protocol controls. It may be observed that these current systems do not depend heavily on either the capabilities of programmed electronic hardware or on the use of modern memory technology. This is interesting since programmed electronic hardware has the flexibility of software control, high operational speed and the ability to be protected physically. Memory based systems also offer significant flexibility and are becoming increasingly cost effective as the price consistently drops by orders of magnitude.

The key management system proposed in this paper takes advantage of memory and programmed electronic hardware technologies to form the basis of a very practical key management solution. This solution involves replacing the concept of distributing encryption or authentication keys with that of the distribution of an electronic unit which, for the purpose of this description, will be termed a Key Transport Device (KTD).

A KTD is used to store and securely transport thousands or even tens of thousands of encryption or authentication keys. Additionally, a KTD provides distributed operational control over the entire key management process by executing a very limited number of logical functions (as requested by a user) according to a strict set of programmed rules.

A typical Key Transport Device (KTD) consists of a microprocessor, a large quantity of memory which may be semi-conductor memory or use other memory technologies but is preferably volatile, and a battery power source in a physically secure package which is only slightly larger and heavier than the average credit card. Each KTD has a unique identification number that is permanently built-in and unalterable. The physical security is such that any attempt to breach the packaging results in the total destruction of the KTD contents.

The memory of the KTD is logically divided into three columns which can be designated as address, random number one and random number two which are represented in this paper by the symbols a, R and R' respectively, as follows:

| a | R | R' |
|---|---|---|
| 1 | A | A' |
| 2 | B | B' |
| 3 | C | C' |
| ... | ... | ... |
| ... | ... | ... |
| n | X | X' |

Although organized in columns, KTD's are always accessed by rows. The address [a] is of course purely logical and requires no physical memory. Random number one [R] functions to provide authentication for key exchanges and random number two [R'] is a key used for encrypting or authenticating communicated messages.

A Key Transport Device performs a very limited set of logical tasks that are associated with the administration of encryption or authentication keys according to a very strict set of programmed rules. Although the rule set can vary depending on the specific application involved, the following is a list of the basic KTD functions for encryption and authentication applications with an explanation of the applicable rules. The notation KTD represents a KTD operation on a vector or scalar input.

KTD[∅] is the KTD instruction to fetch the next authentication challenge. The KTD returns a vector [a,R] in response to this instruction. A KTD is only allowed to access each address [a] once (except KTD[a,R'] is allowed as next instruction) so that every authentication challenge is unique.

KTD[a,R] is the KTD instruction to fetch the decryption or authentication key scalar [R'] associated with [a] if and only if [R] is identical to random number one associated with address [a] (i.e. implicit authentication). This instruction is not valid if the specified address [a] has either been previously accessed via an other instructions or if the specified address [a] is numerically smaller than the last address [a] that was accessed.

KTD[a,R'] is the KTD instruction to verify an authentication key (challenge response) [R'] associated with address [a]. This instruction is only valid if the previous instruction executed was KTD[∅] and the address resulting from the execution of that instruction was identical to [a]. The KTD returns a logical true [verified] or false [not verified] in response to this instruction.

KTD[∅∅] is the KTD instruction to fetch the next encryption or authentication key set. The KTD returns a vector [a,R,R'] in response to this instruction. A KTD is only allowed to access each address [a] once so that every encryption or authentication key is unique.

The KTD key generation and programming process makes use of a special programming device which installs operational parameters as well as encryption and authentification keys. Operational parameters include the subset of enabled KTD functions and a number of variables used to control the actual encryption or authentication hardware. Depending on the KTD design, additional user authentication data can be programmed into the KTD such as passwords, retina scan signatures, etc.

Once the operational parameters have been loaded into a KTD, the KTD programming device generates the required set of truly random numbers. These random numbers are stored in the KTD which is then electronically sealed in preparation for secure transport to the intended user. Key generation does of course, require the usual physical safeguards such a personnel restrictions and a reasonably secure room.

A KTD programmer is designed to prevent any human from reading the generated keys either explicitly or via electromagnetic radiation. Additionally, once all KTD's using a specific set of random numbers have been programmed, the random numbers are erased and cannot be generated again.

Any number of key sets can be programmed into a KTD up to the limit of its memory capacity. The key random numbers can be of any bit length. In some cases the required application will call for a group of KTDs all programmed with the same key sets. In other cases only one pair of KTDs in a group will be identical, with a central KTD including all sets of a plurality of different KTDs.

From an external, electronic viewpoint a KTD can be modelled as a classic finite state machine. The following is a description of how key security is assured during transport.

State #1: This is the original state of a KTD as delivered from the factory. In this state the KTD can be considered a "key blank" that requires programming with a KTD programmer. Once the operational parameters and encryption or authentication keys have been programmed into the KTD, the device is "sealed" by signalling the KTD to move to state #2.

State #2: In this state the KTD is electronically "sealed," thus preventing any external agent from accessing the KTD contents by way of any electronic enquiries. All operational parameters are as inaccessible as are the authentication or encryption keys. The only allowed enquiry is a request for the KTD identification number which is not secret and is usually clearly printed on the external casing.

This electronic security is complimented by physical security that ensures KTD contents cannot be obtained through any physical attack. Physical protection involves encasement of the KTD in a manner that will not allow disassembly without causing the destruction of all internal memory related components. Additionally, KTD circuitry remains active during transport so that it can monitor the physical security controls to deliberately eras the KTD memory if any external attack is detected. These measures along with a few procedural precautions (described next) allow a KTD to "take care of itself" to an extent whereby there are no requirements for additional security precautions during transport (such as a bonded courier). KTD's can be transported to the user destination via any low cost, low security means desired, even the public mail.

Upon arrival at the user destination, a KTD is installed in an authentication or encryption device that is designed to be used with KTD's. The KTD is expected to arrive in state #2. This is checked by the encryption or authentication equipment and reported to the equipment user. Should the KTD arrive in state #3 or state #4 this is evidence that some agent has attempted to access the KTD and therefore the security of the memorized keys would be suspect. However, the KTD requirements associated with a transition to state #3 can be made arbitrarily difficult to limit the possibility of KTD compromise or disruption of KTD distribution. The transition to state #3 can be made conditional on some set of user authentication requirements such as the possession of a one-way authentication KTD (described later), password, retina scan or even the possession of specific encryption equipment.

State #3: If a KTD arrives in state #2 and the user is able to authenticate his or her identity sufficiently (by possession, knowledge and/or physical characteristic) then the push of a single button on the associated encryption or authentication device will cause the KTD to enter state #3. This is the normal operating state of the KTD in which it supplies keys to encryption or authentication equipment. While in this state, KTD security becomes dependent upon its logical adherence to the allowed set of functions and rules (described earlier), protocol and physical security. For certain operational environments it may be desirable to use a version of the KTD which enters state #4 if the KTD is removed from its receptacle in the encryption or authentication equipment.

State #4: Upon entering this state a KTD erases all encryption and authentication key information. This state is unique in that it can be entered directly from any other state as a function of the physical and logical security provided by the KTD. If the KTD is designed to be non-reprogrammable the KTD stays in this state permanently to ensure an attacker has no method of accessing the KTD, reading the contents and then reprogramming and resealing the KTD. Such KTDs can be used particularly for encryption where more information can be read from a single KTD. If a KTD is reprogrammable, that is, a transition from state #4 (erased) to state #1 (program) is allowed, generally speaking such KTDs will not be used for encryption. In this case, this state prevents an attacker from concealing that an attempt has been made to read the KTD.

Thus the operational and physical protection features of a KTD ensure that no attacker can attempt to read the device contents without at the very least revealing that attempt to the end user.

In order to prevent an unauthorized recipient from reading, rewriting and resealing the KTD, one or more of the following steps can be taken:

(a) The limited commands which the KTD will complete are designed to prevent a user from reading all the information from a single KTD.

(b) The unsealing can be made difficult.

(c) The KTD may store a number indicative of the number of times it has been rewritten.

(d) The optional transition from state #6 to state #1 can be disallowed.

An explanation of how a KTD system provides user authentication (authentication by possession) is the easiest introduction to KTD protocols. A session authentication KTD would be enabled to permit three functions:

KTD[∅], KTD[a,R] and KTD[a,R']. For this example it will be assumed that two users wishing to establish sessions are already supplied with KTD's which have been programmed by one of the two users with each KTD having in its memory the same array as set out before in the table aRR'.

Assume user #2 wishes to originate an authenticated session with user #1 and assume that KTD memory address 1 has already been used. The protocol is as follows:

(a) User #2 calls user #1 (eg. on the telephone) and establishes connection.

(b) User #2 authentication device sends the KTD identification (#002 in this example) to user #1.

(c) Given that user #1 recognizes the #002 identification, user #1's authentication device requests KTD[∅] which responds with the vector [2,B]. User #1's KTD marks address 2 as used.

(d) User #1's authentication device sends the authentication vector [2,B] to user #2 in plain text as a numeric challenge.

(e) User #2's authentication device receives the authentication vector [2,B] and requests KTD[2,B] which responds with the scalar [B']. User #2's KTD marks address 2 as unavailable. At this point, user #1 has been authenticated to user #2.

(f) User #2's authentication device sends the scalar [B'] to user #1 in plain text as the solution to the numeric challenge.

(g) User #1's authentication device requests KTD[2,B'] which responds with a logical true [verification] that [B'] is indeed the authentication key associated with KTD address 2 or of course logical false if a false response is received. User #1's KTD marks address as unavailable. At this point, user #2 has been authenticated to user #1.

Therefore, this key management system has the capability to provide authentication in two directions (user to host and host to user) in a virtually simultaneous manner using a simple plain text transaction. Additionally, this authentication has the property of being immune to any communications based attack in the context of user session authentication based on possession and given that the physical security of the KTD's is maintained.

This implicit style of authentication is fundamental to the use of KTD key management for the secure exchange of encryption keys in an open communications environment.

It is interesting to note that if user #1 had concatenated a plain text message to the transmission of step (d) of the above exchange then user #1 would have effectively provided a form of digital signature with that message. Although the message itself would not have been authenticated (subject to replacement, modification or deletion), user #2 could be absolutely certain that the message originated with user #1. Further, the scalar response [B'] from user #2 would act as a verifiable plain text receipt to user #1.

The KTD based key management system protocol for the exchange of encryption or authentication keys is again best demonstrated by example. KTDs used for this purpose need only be enabled to permit two functions: KTD[∅∅] and KTD[a,R]. The remaining two functions: KTD[∅] and KTD[a,R'] would also normally be permitted to facilitate session authentication or message receipting.

Assume that two users wishing to exchange encrypted or authenticated messages are already supplied with KTDs appropriately programmed with the array aRR's as set out before, and that an authenticated session has already been established.

Assume that user #1 wishes to send an encrypted message to user #2 and assume that KTD address 1 has already been used. The protocol is as follows:

(a) User #1's encryption device requests KTD[∅∅] which responds with the vector [2,B,B']. User #1's KTD marks address 2 as unavailable.

(b) User #1's encryption device encrypts the plain text message P using B' as the encryption key (using whatever encryption algorithm is desired) producing the resultant vector $[E_{B'}(P)]$.

(c) User #1's encryption device sends the resultant vector concatenated to the key selection vector: $[E_{B'}(P)][2,B]$.

(d) User #2's encryption device receives the transmission: $[E_{B'}(P)][2,B]$ and requests KTD[2,B] which responds with the scalar [B']. User #2's KTD marks address #2 as unavailable. Again, user #2 can now be certain that the message originated from user #1.

(e) User #2's encryption device decrypts the message: $D_{B'}[E_{B'}(P)] = P$.

This simplified example has demonstrated how a KTD based key management system communicates encryption key selection without revealing the key even in encrypted form. It is further demonstrated that each transaction utilizing the above protocol is implicitly provided with a form of digital signature.

Now that the fundamental mechanism and protocols of a KTD base key management system have been explained, it is important to show how the use of this system with appropriate encryption and/or authentication algorithms meets the general qualifications for the provision of communication security. The te following points of discussion are based on the checklist of ten criteria for communication security proposed by Jueneman, Matyas and Meyer which are as follows. Although all these qualifications are not necessarily relevant to every application this list can be considered useful in determining the strengths and weaknesses of any proposed approach.

The checklist is as follows:

(a) To prevent disclosure of plain text to any person or process not possessing the appropriate cryptographic key.

(b) To prevent release of information by the sender, either accidentally or deliberately, by deceitful or faulty (Trojan Horse) mechanisms operation via nominally secure media or transmission paths.

(c) To permit the receiver to detect any modification of a message, including insertion, deletion, transposition, or modification of the contents.

(d) To permit the receiver to detect any modification of the sequence of messages, either in a session or on a recorded file (including the insertion, deletion, or rearrangement of messages). And further, to prevent the undetectable deletion or loss of message(s) at the end of the session or data file.

(e) To permit verification of message origin and destination. If the same key used for traffic from A to B is used for B to A traffic, messages from A might be delivered back to A, as though they had come from B. Valid messages from C to A might be copied and send as though they had come from B.

(f) To permit the verification of message timeliness. In a telecommunications session environment this implies that the entire session or sequences of messages is current, and not a replay of some previous (perhaps valid) session. In the absence of bidirectional session, the individual message or datagram must at least be timely, that is, with an authenticated time-stamp that is within some delta-t of the current date/time at the receiver.

(g) To permit the sender to detect a fraudulent acknowledgement of message receipt or non-receipt by someone other than the message recipient. That is, the opponent must be prevented from returning fraudulent acknowledgements to the sender while preventing or withholding the recipient's acknowledgements.

(h) To extend the above protections to include the case where any modification of the message, message sequence, or message acknowledgement must be detected, even in the absence of message secrecy, that is, when the plaintext may be known to or even originated by the opponent.

(i) To extend the above protections on a pair-wise basis to multi-party colloquies taking place via multi-drop line, packet network, or satellite broadcast circuit.

(j) To prevent fraudulent disavowal and or forgery of a signed message (digital signature), and to permit both sender and receiver to verify their claims to the satisfaction of an independent referee. The process of notarization and or claim verification should not compromise the secrecy of the information to the referee or any notary, nor should it compromise the digital signature scheme to either the recipient or the referee.

These points are specifically overcome as follows:

(1) Plain text is not disclosed to any person or process not in possession of the appropriate KTD and thus the cryptographic key for each message. This of course assumes the chosen encryption algorithm is reasonably strong and the message length is limited.

(2) The sender of a message cannot be tricked (either accidentally or deliberately) into releasing information via any transmission. Any intruder can be detected using the two-way session authentication process or at the very least would not be able to decrypt the message without possession of the appropriate and operational KTD.

(3) The receiver can detect if a message has been altered via insertion, deletion, transposition or modification if a standard Message Authentication Code (MAC) has been calculated using another key supplied by the KTD. The MAC would be concatenated to the encrypted or plain text message in the usual manner. Again, this assumes the chosen message authentication algorithm is sufficiently strong and assumes a slight modification of the KTD function set.

(4) The KTD approach to key management automatically detects any attempt to modify the sequence of messages in a session (insertion, deletion or rearrangement). A sequence number with each message might still be useful to detect rearrangements on a recorded file of the session and an authenticated message total should still be transmitted at the conclusion of each session to prevent loss of messages at the end of a session.

(5) Message origin and destination are automatically verified using the KTD key management approach. Messages from A can not be delivered back to A as though they came from B since each encryption or authentication key is only used once. Any attempt to resend a message would result in an error response from the recipient's KTD. Additionally valid messages from any third party C can not be copied and sent as though they had come from B since KTD key sets are distributed on a pairwise basis (see section on large scale KTDs).

(6) The timeliness of messages can be verified by the inclusion of an authenticated date and time stamp with each encrypted or authenticated message.

(7) The sender can detect a fraudulent acknowledgment of message receipt or non-receipt by someone other than the intended recipient. For plain text messages an authenticated receipt is automatically provided by the KTD. For encrypted or authenticated messages a receipt can simply be provided by the sender making a second request: KTD[∅] (slightly altered function set required). The returned vector can be concatenated onto the sent message to be interpreted as "receipt requested". Only the designated receiver in possession of the required KTD can acknowledge receipt by returning [a,R'] to the sender who will in turn verify that receipt via his or her KTD. (A simpler method of achieving this same result is described in the section on encryption with digital signature).

(8) The above protections are extended to include the detection of any modification of the message sequence or message acknowledgment even in the absence of message secrecy. The detection of message modification requires the use of a KTD supplied key to generate a Message Authentication Code that is sent with the message.

(9) All of the above protections apply on a pair-wise basis to multi-party colloquies taking place via multi-drop line, packet network or satellite broadcast circuit. This type of network arrangement of "equal" nodes, requires the use of large scale KTD's which are described later.

(10) Although the KTD based key management system as it has been described thus far does provide a form of digital signature with each message, it does not prevent fraudulent disavowal or forgery of an encrypted or authenticated message. However, a simple modification will provide this feature. This modification is described next.

In summary, the KTD based key management approach has been shown sufficient to support all of the encryption, authentication and procedural operations necessary to provide complete communications security.

Without modification, the KTD based key management system can not provide a digital signature when either message authentication or encryption is used. Since the instruction: KTD[∅∅] responds with the vector [a,R,R'], one user is provided with sufficient information to forge a message to his or her self, claiming it was sent by another party using an identically programmed KTD.

The solution is to change the memory organization of the KTD to include an additional column of random numbers. Each KTD memory entry is then a vector [a,R,R',R'']. It is also necessary to change the KTD function and rule set such that the result of the instruction: KTD[a,R] returns the vector [R',R''] (instead of the scalar [R']) and to add an instruction: KTD[a,R''] which returns a logical verification of the R'' input (only if last instruction was KTD[∅∅]). Note that the instruction KTD[∅∅] still only returns the vector [a,R,R'].

Therefore, the sending party can only obtain R'' if the receiving party actually received the message and the receiving party can only obtain R'' if the sending party actually sent the message. It is interesting to note that only one "receipt" is actually used and that the digital signature is provided as part of a plain text transaction.

The now classic question of how Bob and Alice (mutually distrustful people) can play poker on the telephone now has an interesting solution. Using KTD's, the process requires two enhanced digital signature KTD's (one for Alice and one for Bob) which have been programmed by one of the two players (or a trusted third Party). Each KTD stores a randomly shuffled deck of 52 cards.

The KTD functions and rules are similar to those used for session authentication: KTD[∅] means draw card for the other player=[a,R]; KTD[a,R] means fetch card selected by other player=[R',R'']; where KTD[∅] and KTD[a,R] are mutually exclusive functions: KTD[a,R'] means confirm hand card of other player=[verify]: and KTD[a,R''] means confirm discarded card of other player=[verify]; where KTD [a,R'] and KTD [a,R''] are mutually exclusive functions. The example follows:

(a) Bob selects five cards for Alice: KTD[∅], KTD[∅], KTD[∅], KTD[∅], KTD[∅].

Sends vectors: [1,A], [2,B], [3,C], [4,D], [5,E] to Alice.

(b) Alice retrieves hand and receipts: KTD[1,A], KTD[2,B], KTD[3,C], KTD[4,D], KTD[5,E].

Alice's hand is: A', B', C', D', E'; Alice's receipts are: A", B", C", D", E".

(c) Alice selects five cards for Bob: KTD[∅], KTD[∅], KTD[∅], KTD[∅], KTD[∅].

Alice sends vectors: [6,F], [7,G], [8,H], [9,I], [10,J] to Bob.

(d) Bob retrieves hand and receipts: KTD[6,F], KTD[8,H], KTD[9,I], KTD[10,J].

Bob's hand is: F', G', H', I', J'; Bob's receipts are: F", G", H", I", J".

(e) A bidding exchange takes place.

(f) Bob discards three cards by sending vectors: [8,H"], [9,I"], [10,J"] to Alice.

(g) Alice verifies Bob's discards without obtaining knowledge of discards: KTD[8,H"], KTD[9,I"], KTD[10,J"]=[verify], [verify], [verify].

(h) Alice selects three new cards for Bob: KTD[∅], KTD[∅], KTD[∅]. Sends vectors: [11,K], [12,L], [13,M] to Bob.

(i) Bob retrieves 3 new cards and receipts: KTD[11,K], KTD[12,L, KTD[13,M].

Bob's new hand is: F', G', K', L', M'; Bob's receipts are: F", G", K", L", M".

(j) Alice has no discards. A bidding exchange takes place and the hand is called.

(k) Bob shows his hand to Alice by sending vectors: [6,F'], [7,G'], [11,K'], [12,L'], [13,M'].

(l) Alice verifies Bob's hand: KTD[6,F'], KTD[7,G'), KTD[11,K'], KTD[12,L'], KTD[13,M'].

Result is: [verify], [verify], [verify], [verify], [verify]. Bob did not cheat.

(m) Alice shows her hand to Bob by sending vectors: [1,A'], [2,B'], [3,C'], [4,D'], [5,E'].

(n) Bob verifies Alice's hand: KTD[1,A'], KTD[2,B'], KTD[3,C'], KTD[4,D'], KTD[5,E'].

Result is: [verify], [verify], [verify], [verify], [verify]. Alice did not cheat.

Therefore, a successful hand of draw poker has been played by Bob and Alice over the phone using KTD based key management technology in "real" time using absolutely no encryption whatsoever! A virtually unlimited number of poker hands can be played in this manner since the equipment and communications costs are very low.

An originate-only authentication KTD is only provided with the single function capability KTD [a,R] producing the result [R'] or an error. The standard rule applicable to this function is that only one attempt can be made for any given [a]. The interesting feature of such a KTD is that it provides additional security during transport. An intruder that intercepts a one-way authentication KTD must have possession of the matching normal KTD in order to access any information, even if the one-way authentication KTD is unsealed (in state #3).

When more than two equal network nodes wish to converse using a KTD based key management approach, each node must necessarily be provided with a uniquely programmed KTD for every other node (on a pairwise basis) with which secure communication is to take place. This does not imply hundreds of KTD's stacked in computer rooms but rather the use of large scale KTD's utilizing existing mass memory technologies. Therefore, each network node still only requires one KTD, although it is necessarily larger in size.

Thus for a network of N "equal" nodes there is a requirement for N large scale KTD's, each with (N−1) programmed KTD key sets. Over this N node network (N×(N−1))/2 unique KTD key sets are needed.

These large scale KTD's are of course more difficult to protect physically for distribution purposes. The solution to this problem involves either additional physical protection or the information on a large scale KTD can be encrypted with keys stored in an originate-only authentication KTD.

Other possible uses of these techniques include the use of KTD keying material for encryption based on other than message boundaries. By applying this concept, a user could theoretically have discretionary control over key granularity for each message up to the point where the KTD effectively becomes a one-time pad (continuous control over encryption strength).

Another area which presents some interesting possibilities is the use of KTD based key management with hierarchical key distribution. The use of multiple personal KTD's to protect access to information by combinatorial control (e.g.: cooperation of President plus one VP or cooperation of three VPs would be required to gain access) is also possible.

Choice of bit length for each random number along with the associated economies and access probability tradeoffs is of obvious importance. The description of these tradeoffs is however, largely self evident and may be calculated if the reader is so inclined.

Other possible arrangements are as follows:

(a) The use of KTD keying material for encryption based on other than message boundaries:

KTD keying material can be applied at session boundaries, message boundaries, character boundaries, or even variable boundaries.

There are two possible approaches to dynamically access keys larger than a KTD may contain. Pictorially, these are:

|  | a | R | R' |
|---|---|---|---|
| access | 1 | A | A' |
|  | 2 | B | B' |
|  | 3 | C | C' |
| next access | 4 | D | D' |
|  | o | o | o' |
|  | o | o | o' |
|  | n | X | X' |

Key is [A'] [B'] [C'] by concatenation

OR

|  | a | R | R' |
|---|---|---|---|
| access | 1 | A | A' |
|  | 2 | B | B' |
| next access | 3 | C | C' |
|  | 4 | D | D' |
|  | o | o | o' |
|  | o | o | o' |
|  | n | X | X' |

Key is [A'] [A] [B'] by concatenation

In an environment where key granularity is changing dynamically, the chosen key length must be transmitted to the recipient.

(b) KTD based key management with hierarchical key distribution:

By using KTDs to drive a hierarchial key management system, the operational life of a programmed KTD could be significantly extended. This life extension is at the cost of security since key density, compared with message length is decreased.

A KTD could easily provide a new "master key" each hour, or day, or month or at any length of time. The "master keys" would then be used to encrypt "session keys" that can be transmitted to users for decryption and use.

(c) The use of KTDs for combinatorial control:

This is a variant of Shamirs' method first published in 1979. Shamir proposed providing various positions within an organization with sets of points (x-y coordinates) that could be used to solve an n-degree polonomial in order to protect an encryption key. i.e., when the equation: $14x^3 + 21x^2 + 14x + 12 = y$ is solved, then 12 would be the encryption key.

Now, access via the same physical approach can be provided with KTDs, only without the need for the mathematical derivations. For example, KTDs would be supplied to the president, each vice president and each manager. A single station would be capable of holding, say 4 KTDs. That station would then use software logic to provide access to the encryption key only in the presence of, say one president or three vice presidents or four managers. Any combination is of course, possible.

(d) The user of KTDs to allow use of other authentication techniques in a telecommunications environment:

KTD technology has the unique capability of enabling other authentication systems to work in telecommunications environments. Generally, retina scanners, fingerprint analyzers or hand geometry analyzers are used for local (e.g., door) access applications because if the information produced by these devices is transmitted on a telecommunications circuit, that information could be recorded via a line-tap, then used by another person. Passwords, which are commonly used on telecommunication systems, also suffer from this deficiency.

Since KTDs can provide memory to compare this data against a local input device, the authentication can be achieved at the user location and then confirmed via a standard KTD authentication exchange as described earlier.

(e) KTD technology applied to physical locks

KTD technology to act as a general locking mechanism. A mechanical lock authenticates an individual by his or her possession of a physical, mechanical key. Similarly, a KTD lock would authenticate an individual by his or her possession of an appropriately programmed KTD. The advantages of this approach would be electronic controlled over access and over the number of access.

(f) For Pay TV protection

KTD key management technology to provide simple, but virtually unbeatable Pay TV channel encryption. Only those subscribers with the KTD for a given subscription period could decrypt the channel signal for viewing. Advantages would include the ability for parents to remove the KTD when they're absent.

(g) General advantages

The following advantages can thus be obtained:

The operational and physical protection features of a KTD ensure that no attacker can attempt to read the device contents without at the very least revealing that attempt to the end user.

This key management system has the capability to provide authentication in two directions (user to host and host to user) in a virtually simultaneous manner using a simple plain text transaction.

This authentication has the property of being immune to any communications based attack in the context of user session authentication based on possession and given that the physical security of the KTD's is maintained.

A KTD based key management system communicates encryption key selection without revealing the key, even in encrypted form.

Each transaction utilizing the KTD authentication protocol is implicitly provided with a form of digital signature.

The KTD based key management approach has been shown sufficient to support all of the encryption, authentication and procedural operations necessary to provide complete communications security.

The digital signature is provided as part of a plain text transaction utilizing only one "receipt".

A user could theoretically have discretionary control over key granularity for each message up to the point where the KTD effectively becomes a one-time pad (continuous control over encryption strength).

One example of the system used for authorization will now be described in conjunction with the accompanying drawings in which:

DESCRIPTION OF THE DRAWINGS

In the drawings like characters of reference indicate corresponding parts in the different figures.

DETAILED DESCRIPTION

Figure 1:
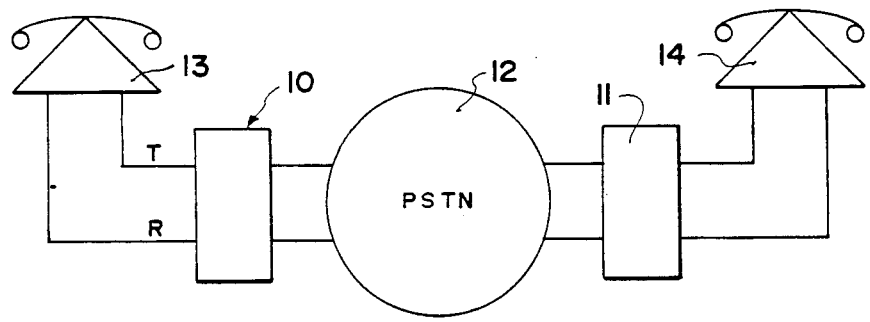
FIG. 1 is a simple schematic illustration showing the connection of the security device according to the invention within the public switched telephone network.

The security device according to the invention provides a first unit and a second unit indicated at 10 and 11 respectively in FIG. 1 each of which is connected between the public switched telephone network indicated generally at 12 and a user device 13, 14.

In many cases the user device 13 will comprise a central access port which is intended to be accessed by a number of remote units one of which is indicated at 14. The use of the public switched telephone network provides of course the convenience of near universal access. However this access also provides the opportunity for unauthorized users to enter or attempt to enter the port and tamper with or extract information from the central port.

Although the invention therefore is shown as including only two such units there may be a large number of units provided only to authorized users. The units supplied to authorized users can be provided in a suitable plastics box having conventional jack plugs which enable the unit to be coupled into the telephone line immediately adjacent the user device which may be a computer terminal including a modem or other equipment. In addition the casing of the unit can include the necessary and conventional sealing arrangements to prevent tampering or stealing of the unit itself. However these features are not part of the present invention and therefore will no be described in detail.

Figure 3:
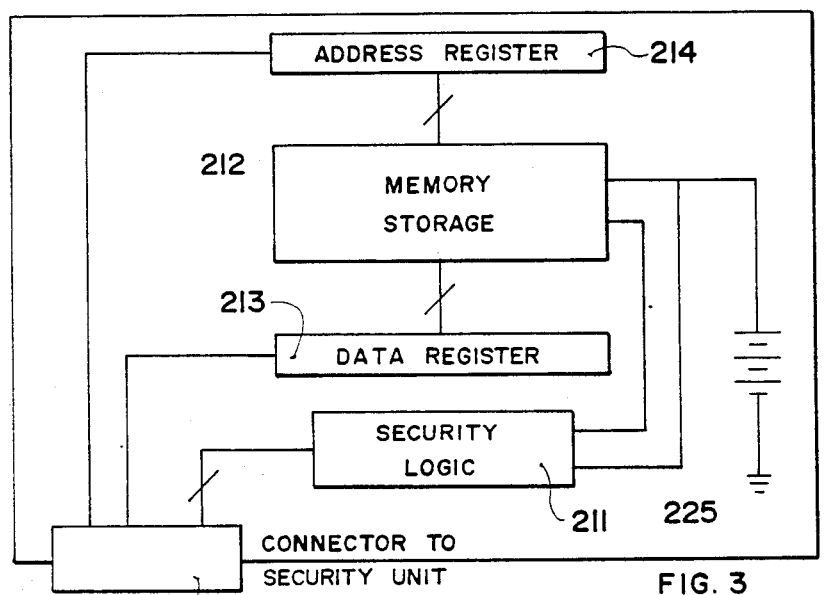
FIG. 3 is a block diagram of the KTD or memory module for connection to the unit of FIG. 2.
Figure 2:
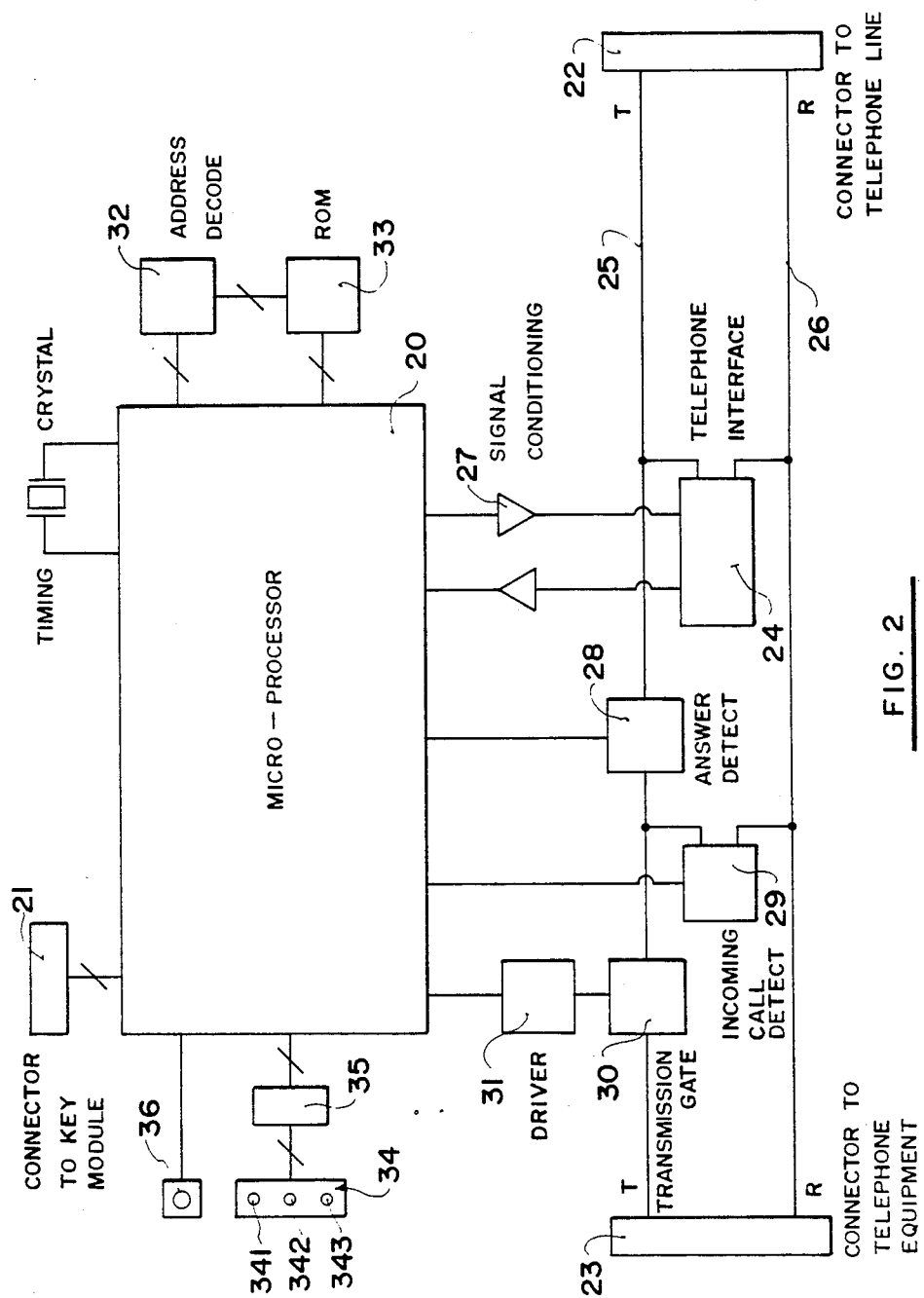
FIG. 2 is a block diagram of one unit of the telecommunications security device of FIG. 1.

Turning now to the unit as shown in FIG. 2, this comprises a central or unit microprocessor 20 including a connector to a KTD or memory module indicated at 21 with the module itself being shown in detail in FIG. 3. The unit further includes jack plugs 22 and 23 as previously described which are of a conventional type for connection to the telephone line. A telephone interface 24 is connected across the lines 25 and 26 for receiving signals on the line and for injecting signals back onto the line for transmission to the remote equipment. The interconnection between the telephone interface 24 and the unit microprocessor 20 includes signal conditioning devices 27 of conventional form. Further devices connected across the telephone line include an answer detect unit 28 and an incoming call detect unit 29 again of conventional construction. Finally, connected in one or both of the lines is a transmission gate 30 which is under the control of the unit microprocessor via a driver 31 which therefore allows or prevents access to the user equipment attached to the jack 23 depending upon the conditions sensed by the unit microprocessor as explained in detail hereinafter.

The unit microprocessor also has attached thereto an address decode unit 32 connected to a ROM 33. The unit microprocessor also drives a number of indicators 34 through a driver 35 and receives input from a test button 36.

The KTD is shown at 21A in FIG. 3 again in block form and comprises a connector 210 for connection to the connector 21 of the unit of FIG. 2. The connector communicates with a security logic circuit or KTD microprocessor 211 which in turn communicates with a KTD memory storage 212 including a data register 213 and an address register 214 whereby information can be introduced into the memory storage and extracted from the memory storage under control of the security logic 211.

For convenience of manufacture and also to enable the units to be used in a situation where each party is free to call the other that is calls can originate at either of the units 10 and 11, the units are identical and each can carry out the functions as explained hereinafter. However if required, each can be limited to one of the functions by storage of a simple command in the KTd microprocessor.

Figure 5:
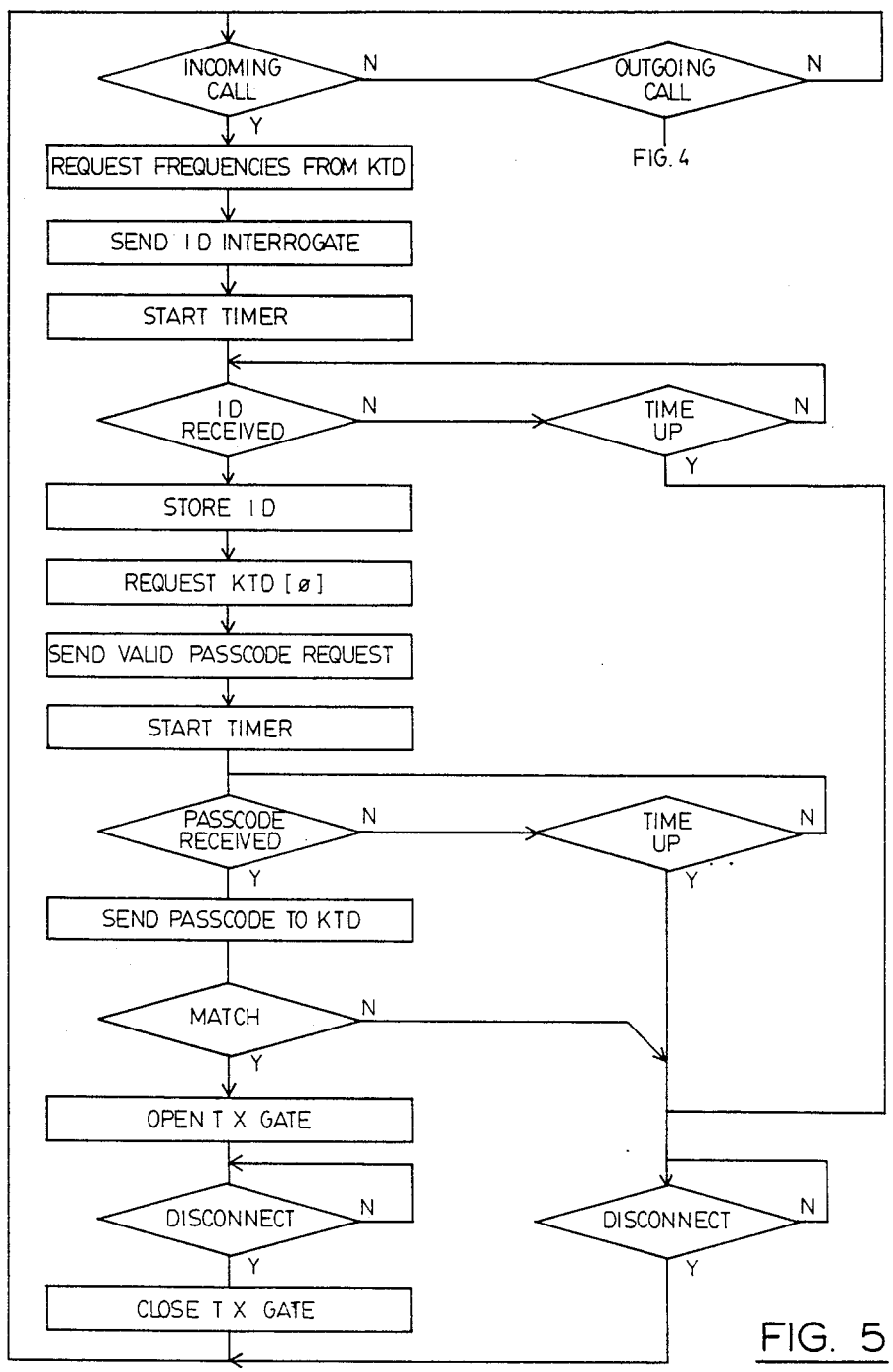
FIG. 5 is a flow chart for the first unit which acts as a central or receiving unit.

Turning now to the flow chart of the receiving unit shown in FIG. 5, the unit will leave idle state upon detection of an answer condition of an incoming call. The public switched telephone network or PSTN provides an incoming call indication to the address required usually by application of a voltage to the line intended to cause the audible ringing common to most voice telephone terminal equipment. When the telephone terminal equipment provides an answer indication, usually by drawing more than a certain amount of direct current from the PSTN, the PSTN will create a communication channel between the call originator and the destination. Thus the answer detect unit 28 of FIG. 2 detects the answer condition provided by the user equipment attached to the jack 23. This answer detect is communicated to the microprocessor. The unit microprocessor then acts to retrieve from the KTD 212 operating frequencies which ac as an identity interrogation signal for transmission on the line. The operating frequency signal is transmitted via the telephone interface 24 on the line to the remote location from which the call is originated.

This operating frequency signal which is also stored in the KTD memory of the originating unit acts as an interrogation signal requiring the originating unit to submit a identity signal as will be explained hereinafter.

This arrangement whereby the unit microprocessor responds to the telephone call by the operating frequency avoids the line returning the carrier tone which is usually provided by a computer port modem and provides the characteristic tone which indicates to the knowledgeable telephone user that the line is connected to a computer modem. This feature therefore prevents "hackers" from discovering computer ports by scanning telephone exchanges looking for the characteristic tone.

The unit microprocessor simultaneously with controlling the transmission of the ID interrogation signal starts a timer providing a period of time in which the required ID signal must be received.

On receipt of an ID signal within the required period of time, the ID signal is checked to be of a proper format and stored in the unit memory for future use. The unit microprocessor 20 then moves to extract from the KTD memory one of the plurality of pass code requests for transmission with the associated address through the interface 24.

The memory 212 of the KTD is arranged to provide sufficient amount of memory to store for example 500 pairs of 32 bit security codes and associated request signals. Thus the memory is divided into addresses or memory location pairs with each pair including a first signal which will be transmitted and a second signal which will be expected in reply.

The KTD microprocessor 20 is arranged so that it looks in the KTD memory to each pair in turn and extracts from that pair the request signal and associated address for transmission on the line. The KTD functions by receiving a request form, from the unit processor, locating the next address and returning the data at that address with the address to the unit processor, also in serial form. The address information will be as large as it needs to be to uniquely select data from the key. This will be at least 24 bits but may need to be larger for some applications.

Having thus selected the next in turn request signal and address from the connected KTD memory, and transmitted this on the telephone line through the interface 24, the unit microprocessor again starts a timer circuit providing a short period of time in which it expects to receive the required security code.

On receipt of a security code, the unit microprocessor acts to send the security code into the KTD for comparison in the KTD or memory module of that security code associated in the memory with the request signal previously extracted. The unit processor then receives either a logical true signal or a logical false signal from the KTD. On obtaining the logical true the unit microprocessor acts to control the gate 30 through the driver 31 to open the transmission gate to allow communication between the network and the user equipment.

In order therefore to obtain the necessary opening of the transmission gate, it is necessary for the unit microprocessor to initially receive an ID signal of the required format within a required period of time and subsequently to receive the required pass code or security code again within the required period of time.

After the transmission gate has been opened, the unit microprocessor acts to monitor a disconnect of the communication channel and upon detecting such a disconnect acts to close the transmission gate. It is then in the position to receive a further incoming call and repeat the cycle. On such receipt of a further call, it will be appreciated that the unit follows the same procedure except that it receives from the KTD the associated security code associated with the next address so that the signal and expected returned code are totally different and in no way connected with the signals previously issued.

As shown in the flow chart of FIG. 5, it will be noted that if the ID signal is not received within the required period of time that is the time up signal is generated by the timer circuit, the unit microprocessor does not issue a pass code request. It cannot therefore act to open the transmission gate if the ID signal is not received in due time. The device will always behave in the same way regardless of the information it is given in order to provide an unauthorized user with no information that might assist in by-passing the device. Similarly if the pass code is not received or is not received in time the unit microprocessor moves to the disconnect procedure and reverts to the idle state waiting for a new call.

Figure 4:
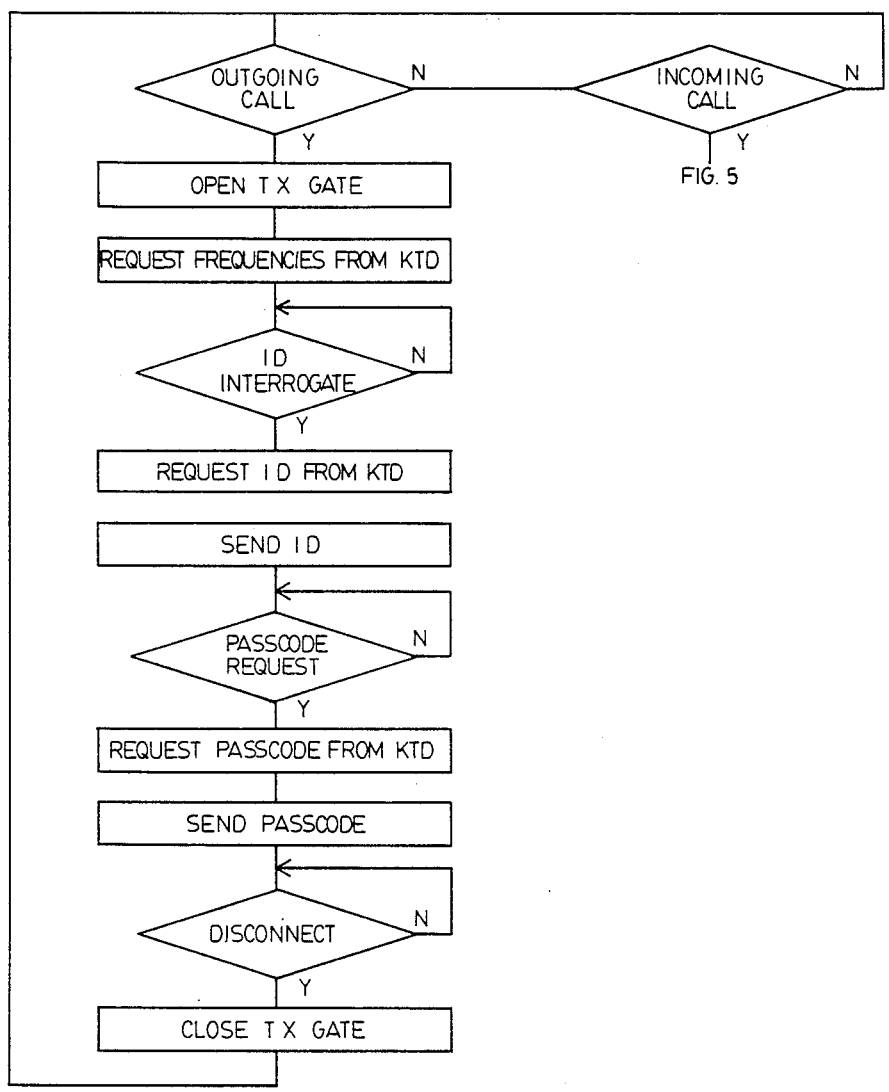
FIG. 4 is a flow chart for the second unit which acts as a remote or originating unit.

Turning now to the flow chart of the originating unit shown in FIG. 4, the device will leave idle state upon the detection of an outgoing call originating at the terminal equipment with which the unit is associated and acts to fetch the operating frequencies. It then acts to look for the operating frequencies issued by the receiving unit and on receipt of the ID interrogate signal will act to open the transmission gate and fetch the ID from the KTD memory and to transmit the ID on the line via the interface 24. It will then enter a wait loop for the pass code request from the receiving unit. When the request is received, the unit microprocessor 20 will act to retrieve and send from the KTD memory the pass code associated with the ID request signal in the memory. If an incorrect request signal is received that is the transmitted address and request signal do not match, the KTD microprocessor on failing to find a match in the memory acts to generate, by an algorithm a false pass code which is then sent to avoid the release of information about the system. The unit then remains in connected state until it detects a disconnect of the communication channel following which it will close the transmission gate.

Thus the unit can act, as previously explained, either as a receiving unit or as an originating unit and the unit microprocessor and the attached KTD act accordingly to extract the relevant information from the memory as required.

Turning now to the indicators associated with the unit microprocessor 20, these are arranged to be driven briefly when the equipment attached to the unit is taken off hook so that the unit extracts power from the telephone line for a short period of time sufficient to drive the indicators briefly for observation by the user.

The first of the indicators shown at 341 is used to indicate when all of the memory locations in the KTD memory have been used once that is all of the pairs of request signals and associated security codes have been used and thus will be repeated if the unit continues to use the same memory storage. Alternatively the indicator may operator when the usage is approaching complete so that new KTDs can be obtained before the system is halted by no further availability.

The second indicator shown at 342 will be illuminated if the unit detects receipt of a security code which fails to properly match with the expected security code. This will indicate that an unauthorized user has attempted to breach the security and has failed to do so.

The third indicator shown at 343 is used to show that a newly introduced key has previously been read as will be explained in more detail hereinafter. The test button 36 is used to reset the indicators 341, 342 and 343 so that after the information has been extracted the indicators revert to their initial condition.

Figure 6:
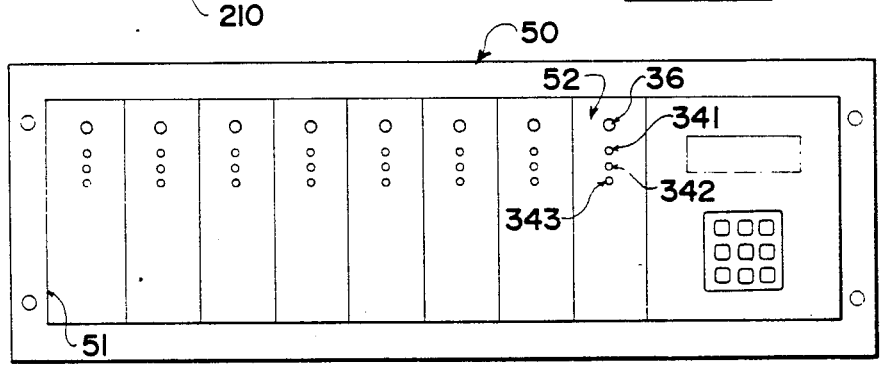
FIG. 6 is a front elevational view of a rack storing a plurality of the units of FIG. 2.

Turning now to FIG. 6, there is shown a rack unit for storing a plurality of security units each of the type shown in FIG. 2. Such a rack unit is generally indicated at 50 and is used in conjunction with a multi-port access terminal so that each unit is associated with a respective one of a plurality of telephone lines. The units each act in the manner previously described but can be coupled together so as to provide on for example, a common bus information concerning the received ID signals, times of connect and times of disconnect and also the information concerning improper pass codes. Such a rack unit can comprise simple receiving areas 51 for a circuit board 52 so that the unit can be provided without the necessary housing necessary for a single unit. The rack unit can then be coupled to a conventional printer or other data equipment to print out information extracted from the individual units. Such information can be used for keeping a record of access by various authorized users by way of their received ID for audit trail or other purposes.

Turning now to the KTD of FIG. 3, it will be appreciated that this device is mounted in a housing 215 so that it is separable from the unit itself and thus a complete set of identical KTDs can be obtained for a group of the units and introduced or replaced whenever necessary. Thus when the memory has been used once it is a simple matter to replace the KTDs by re-written KTDs with a new memory storage each of which of course is identical except for the unique ID.

The security logic circuit of the KTD 211 controls the reading and writing of the pairs of request signals and security codes within the memory storage together with the fixed rule set by which access is obtained to the memory. The security logic circuit is arranged so that after writing the required information into the memory it can receive a seal command which acts to prevent the security logic circuit re-transmitting the information from the memory storage.

Figure 7:
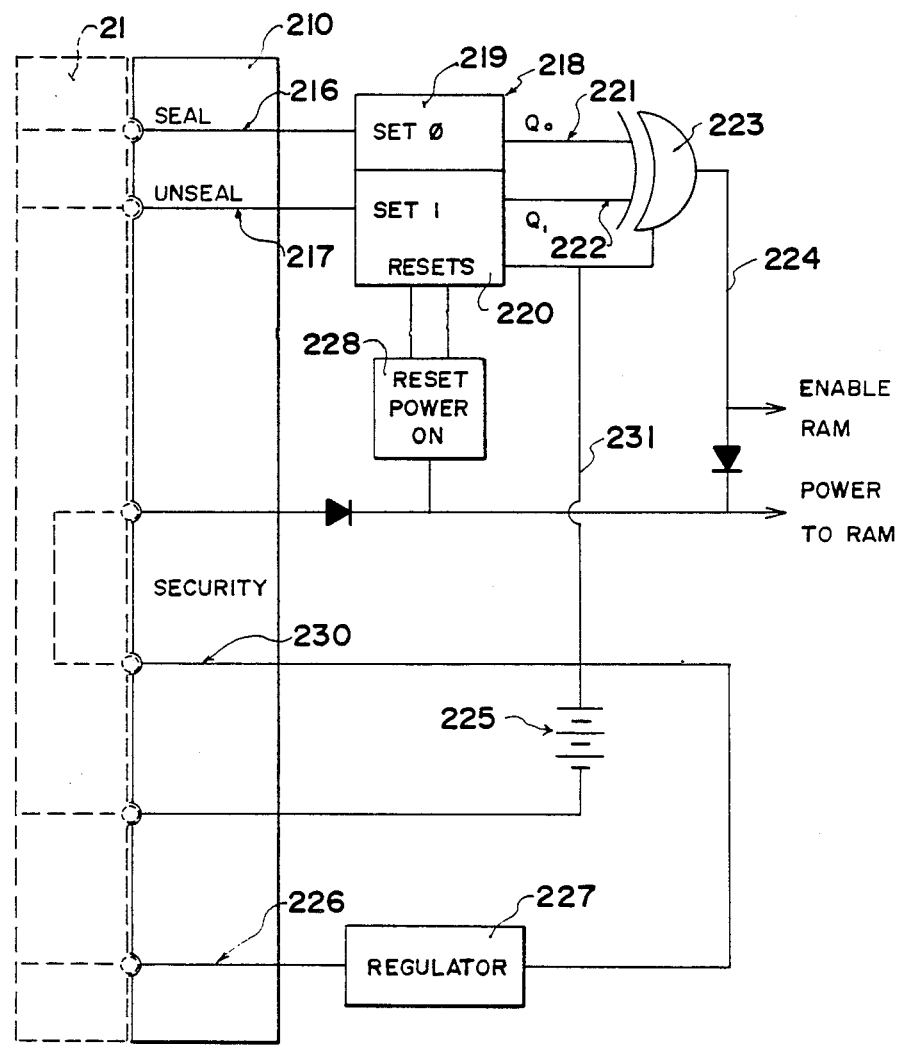
FIG. 7 is a circuit diagram of the security logic circuit of FIG. 3.

Turning therefore to FIG. 7, a simple circuit diagram is shown for the security logic circuit of FIG. 3. Specifically the circuit includes the connector 210 for connection to the connector 21 of the main unit. The connector 210 includes a first line 216 and a second line 217 indicated as "seal" and "unseal" respectively which are connected to a pair of flip flops 218 which in conventional manner have two separate states indicated at 0 and 1 respectively. The outputs of the two separate flip flops 219 and 220 of the pair 218 are coupled at 221 and 222 to an exclusive or-gate 223 of conventional form. The output from the exclusive or-gate 223 indicated at 224 acts to enable or disable the memory or RAM 212 depending upon the output on the line 224, that is a state 0 acts to enable the RAM and a state 1 to disable the RAM.

The KTD further includes a battery 225 which is connected through the connector 210/21 to provide power to the memory 212 for retaining the memory when the device is disconnected from the main unit. A secondary power from the unit is provided on the line 226 through a regulator 227 so that the battery power is only used for storage when the KTD is disconnected.

The flip flops 218 can only be reset via a reset unit 228 so that once switched from 0 state to the 1 state remain in that state until reset.

In a first state of the KTD after initial manufacture and prior to insertion of any records into the memory, both the flip flops are at 0 state thus providing a state 0 on the line 224 to enable connection to the memory 212. At this time the link indicated at 230 is disconnected and the line 224 is at state 0, hence there is no power to the memory.

At the next stage the KTD is inserted into the unit thus completing the connection at 230 and providing power to the memory or RAM 212. At this state the memory can be written with the necessary information and the memory re-read to provide a verification of the necessary information.

At this time a seal command can be supplied on the line 216 from the main writing unit thus putting the first flip flop 219 into a state 1. The line 224 thus turns to the state 1 disabling the RAM.

In this condition the KTD can be separated from the writing unit and sent to the remote destination using normal channels. Power to the RAM is supplied by the battery 225 through a line 231, or-gate 223 and line 224.

When received at the remote destination for usage, the KTD is inserted into the unit and connected thus to the connector 21. The first action of the security unit on receiving a telephone call, that is if the hand set is lifted at the user equipment, is to attempt to read the memory. An indicator on the security unit is illuminated to show that the unit is unable to read the memory so that the user can immediately see if the memory can be read. If the memory can be read it has thus received an unseal command as explained hereinafter and thus has been or may have been read and thus may be no longer secure.

If the memory is unable to be read, that is it has not yet received the unseal command, the pressing of the button 36 acts to send an unseal command on the line 217 thus changing the state of the flip flop 220 to a state 1 which provides a state 0 on the line 224 thus enabling the RAM. Power to the RAM is supplied at this stage via the regulator 227 and the link 230.

The KTD can thus continue to be used while connected to the security unit and provides the memory as previously explained.

However, on separation from the main unit the link 230 may be severed and the line 224 is at state 0 thus providing no power to the RAM and erasing the memory.

The flip flops 218 can only be reset subsequent to complete erasing of the memory through the reset unit 228. In other words the unit 228 only acts upon the removal of power from and subsequent restoration of power to the RAM and thus once the flip flop 220 has been changed to the state 1, it cannot be reverted to state 0 without erasing the memory. This technique does therefore not necessarily prevent the memory being read but certainly provides an indication in a simple manner that it may have been or has been read whereupon immediate knowledge is obtained of the breach of security following which all of the KTDs including that memory can be rewritten with fresh information.

Instead of the hardware described above in relation to FIGS. 3 and 7, the functions described could be performed by a KTD microprocessor programmed with suitable logic.

Figure 8:
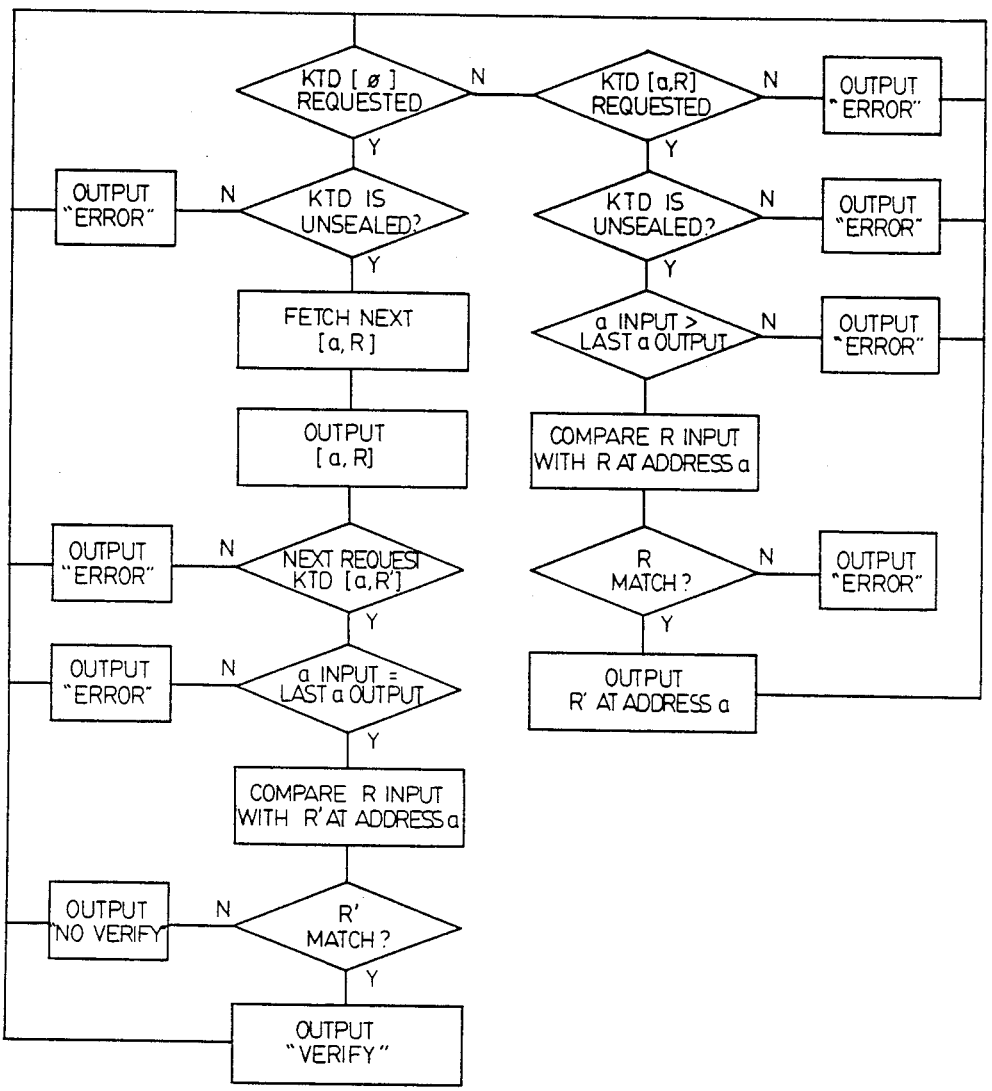
FIG. 8 is a flow chart for the KTD or memory module of each of the units.

The flow chart showing the logic or fixed set of rules under which the KTD operates is shown in FIG. 8. In this way, the KTD can operate with either the originating unit or the receiving unit, but if obtained and accessed improperly will give no complete access to its contents.

The telecommunications security device therefore provides a number of advantages. Firstly it is resistant from any communication based break-in attempt including those involving passive line tapping since recording of previous information gives no details whatever concerning later required passwords. Secondly the unit is completely user transparent that is no action is required by the user and it does not rely upon any memory of the user to actuate the transmission gate. Thirdly the unit does not in ay way interfere with the use of the telephone equipment to communicate with other unsecured telephone addresses.

The KTD arrangement itself and particularly the security system whereby the KTD records the receipt of the necessary command to read the KTD can be used with other equipment following suitable modification to the stored memory and logic circuit as will be apparent to one skilled in the art. Such other equipment could be encryption devices as described hereinbefore where the necessary code for the encryption is stored in the memory and can be replaced by replacement or re-wiring of the memory.

In order to provide further security against reading of a KTD, the KTD security logic circuit includes means for generating a number similar to a security code when a signal similar to a security code request signal is received but one in which the request signal and address do no match.

Since various modifications can be made in our invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A security system for authenticating a potential user of a service comprising a first unit associated with the service, a second unit associated with the user, each of said first and second units including means for communicating with the other through a communication medium, each of said first and second units including memory means, each of said memory means having stored therein a plurality of groups of random numbers, the numbers of each group being logically associated together as a group with a logical address in the memory, said random numbers of said groups and the associated addresses in the memory means of the first unit being identical to those of the memory means of the second unit, said first unit including control circuit means arranged such that, in a first cycle of operation said circuit means acts, to extract from the memory means thereof one of the random numbers in one of said groups at a respective address to communicate said one random number to said second unit, to compare a received signal from the second unit with another of the random numbers in said one of said groups, and to provide authentication of said user only upon a match of said received signal with said another of the random numbers, and in each subsequent cycle of operation to extract one of the random numbers from a respective different one of the groups in the memory means, said second unit including control circuit means arranged such that it acts on receipt from said first unit of said one of the random numbers in said one of said groups to extract from said memory means thereof said another of said random numbers of said group.

2. The invention according to claim 1 wherein said memory means of at least said second unit is provided in a memory module which is separable from said second unit for separate transportation.

3. The invention according to claim 2 wherein said memory module comprises a casing forming an outer protection for the module by which the module is a separately transportable unit, electrical connection means in said casing by which said module can be electrically connected to said second unit, a memory in said casing, means in said casing arranged to retain material in said memory when said module is separated from said second unit, said memory having stored therein said plurality of groups of random numbers, and a logic control circuit arranged such that the memory module has a fixed set of rules which control access to the random numbers in the groups.

4. The invention according to claim 3 wherein said logic control circuit is arranged, upon writing of said groups of random numbers into said memory, to prevent reading of said random numbers from said memory until receipt of a command and to record receipt of said command, said second unit including means for determining and indicating receipt of said command in said memory module, whereby said user can determine whether the memory module has been read prior to insertion into said second unit.

5. The invention according to claim 4 wherein said logic control circuit includes means providing a first state in which the groups of random numbers can be written into the memory, a second state in which the memory cannot be read, and a third state in which the memory can be read, said state providing means being arranged to prevent transfer from said third state to said second state except via said first state and erasing of information on said memory, means for receiving a command signal for transferring from said second state to said third state, and means for indicating that said command signal has been received.

6. The invention according to claim 1 including means for indicating when a predetermined portion of said groups have beed used by the extraction therefrom of said one random number.

7. The invention according to claim 1 wherein said second unit control means includes means for generating a signal similar in structure to said another random number when a signal similar in structure to but different from said one random number is received by said second unit.

8. The invention according to claim 1 wherein said first unit is arranged to communicate to said second unit, with said one random number, a signal indicative of the respective address of the group in the memory means, and wherein the second unit is arranged to locate said respective address, to compare said one random number with one random number stored at the respective address and to provide said another random number only upon a match of said one random number with said one random number stored at said address.

9. The invention according to claim 8 wherein said memory module of said second unit will only provide said another random number associated with said address if the address has not previously been used.

10. The invention according to claim 1 wherein said memory of said first unit comprises a memory module including a casing forming an outer protection for the module by which the module is a separately transportable unit, electrical connection means in said casing by which the module can be electrically connected to said first unit, a memory in the casing, means in said casing arranged to retain material in said memory when said module is separated from said first unit, said memory having stored therein said plurality of groups of random numbers, and a logic control circuit arranged such that the memory module has the following fixed set of rules:
(a) the memory module will provide on receipt of an instruction signal, a signal indicative of then next address together with said one random number associated with the next address;
(b) when given a signal expected to be said another random number the memory module will compare said signal with said another random number associated with said next address and will provide a signal indicative of a match or a signal indicative of a failure to match without providing information concerning said another random number;
(c) the memory module will only use a group of random numbers associated with a particular address if that group and associated address have not previously been used.

11. The invention according to claim 1 wherein the memory of each of said first and second units is provided as a separate memory module including a casing forming outer protection for the module by which the module is a separately transportable unit, electrical connection means in said casing by which said module can be electrically connected to said respective unit, a memory in said casing, means in said casing arranged to retain material in said memory when said module is separate from the respective unit, said memory having stored therein said plurality of groups of random numbers, and a logic control circuit defining a fixed set of rules which control access to the random numbers in the groups, said random numbers of said groups and the associated addresses in said memory module of said first unit being identical to those of said memory module of the second unit and each of said memory modules having the following fixed set of rules:
(a) on receipt of an intersection from the respective unit the memory module will provide a signal indicative of the next address and said one random number associated with that address;
(b) if provided with a signal indicative of an address together with said one random number associated with the address the memory module will provide said another random number associated with that address;
(c) if the memory module has done (a) it will not do (b);
(d) if the memory module has done (a) it will on receipt of a further signals compare that further signal with said another random number at that address and will provide a signal indicative of a match or a failure to match thereof;
(e) the memory module will not repeat either (a) or (b) at an address which has previously been used.

12. A memory module for storing and transporting a plurality of numerical keys for use in a security system comprising a casing forming an outer protection for the module by which the module is a separately transportable unit, electrical connection means in said casing by which said module, can be electrically connected to said security system, a memory in said casing, means in said casing arranged to retain material in said memory when said module is separated from said security system, said memory having stored therein a plurality of groups of random numbers, the numbers of each group being logically associated together as a group at a logical address in the memory, and a logic control circuit arranged to provide for the memory module a fixed set of rules which control access to the random numbers in the groups as follows:

(a) the memory module will provide on receipt of an instruction a signal indicative of the next address together with said one random number associated with the next address;

(b) when given a signal expected to be said another random number the memory module will compare said signal with said another random number associated with said next address and will provide a signal indicative of a match or a signal indicative of a failure to match without providing information concerning said another random number;

(c) the memory module will only use a group of random numbers associated with a particular address if that group and associated address have not previously been used.

13. The invention according to claim 12 wherein said logic control circuit is arranged, upon writing of said groups of random numbers into said memory, to prevent reading of said random numbers from said memory until receipt of a command and to record receipt of said command, whereby said security system can determine whether the memory module has been read prior to insertion into said security system.

14. The invention according to claim 13 wherein said logic control circuit includes means providing a first state in which the groups of random numbers can be written into the memory, a second state in which the memory cannot be read, and a third state in which the memory can be read, said state providing means being arranged to prevent transfer from said third state to said second state except via said first state and erasing of information in said memory, means for receiving a command signal for transferring from said second state to said third state and means for indicating that said command signal has been received.

15. The invention according to claim 12 wherein said logic control circuit is arranged on receipt of a signal indicative o an address of a group in the memory together with one random number associated with final that address to compare said one randon number with one random number stored at the respective address and to provide another random number associated with that address only upon a match of said one random number with said one random number stored at said address.

16. A memory module for storing and transporting a plurality of numerical keys for use in a security system comprising a casing forming an outer protection for the module by which the module is a separately transportable unit, electrical connection means in said casing by which said module, can be electrically connected to said security system, a memory in said casing, means in said casing arranged to retain material in said memory when said module is separated from said security system, said memory having stored therein a plurality of groups of random numbers, the numbers of each group being logically associated together as a group at a logical address in the memory, and a logic control circuit arranged to provide for the memory module a fixed set of rules which control access to the random numbers in the groups as follows:

(a) on receipt of an intersection the memory module will provide a signal indicative of the next address and one random number associated with the address;

(b) if provided with a signal indicative of an address together with said one random number associated with the address, the memory module will provide another random number associated with that address;

(c) if the memory module has done (a) it will not do (b);

(d) if the memory module has done (a) it will on receipt of a further signal compare that further signal with said another random number at the address and will provide a signal indicative of a match or a failure to match thereof;

(e) the memory module will not appear either (a) or (b) at an address which has previously been used.

17. A security system for secure information transmission comprising a first unit for transmitting information, a second unit for receiving the information, each of said first and second units including means for communicating with the other through a communication medium, each of said first and second units including memory means, each of said memory means having stored therein a plurality of groups of random numbers, the numbers of each group being logically associated together as a group with a logical address in the memory, said random numbers of said groups and the associated addresses in the memory means of the first unit being identical to those of the memory means of the second unit, said first unit including control circuit means arranged such that, in a first cycle of operation, said circuit means acts to extract from the memory means thereof a first and a second random number from one of said groups at a respective address, to generate a concatenated message including said first random number and including said information algorithmically acted upon using said second random number and to transmit said message to said second unit, and in each subsequent cycle operation to extract random numbers from a respective different one of the groups in the memory means, said second unit including control circuit means arranged on receipt from said first unit of said message including said first random number to extract from said memory means a random number from said one of said groups and to alter said message by algorithmic calculation using said random number so extracted.

18. The invention according to claim 17 wherein said memory means of at least one of said units is provided in a memory module which is separable from one of said units for separate transportation.

19. The invention according to claim 18 wherein said memory module comprises a casing forming an outer protection for the module by which the module is a separately transportable unit, electrical connection means in said casing by which said module can be electrically connected to said second unit, a memory in said casing, means in said casing arranged to retain material in said memory when said module is separated from said second unit, said memory having stored therein said plurality of groups of random numbers, and a logic control circuit arranged such that the necessary module has a fixed set of rules which control access to the random numbers in the groups.

20. The invention according to claim wherein said logic control circuit is arranged, upon writing of said groups of random numbers into said memory, to prevent reading of said random numbers from said memory until receipt of a command and to record receipt of said command, respective one of said first and second units including means for determining and indicating receipt of said command in said memory module, whereby said user can determine whether the memory module has been read prior to insertion into said respective unit.

21. The invention according to claim 20 wherein said logic control circuit includes means providing a first state in which the groups of random numbers can be written into the memory, a second state in which the memory cannot be read, and a third state in which the memory can be read, said state providing means being arranged to prevent transfer from said third state to said second state except via said first state and erasing of information in said memory, means for receiving a command signal for transferring from said second state to said third state and means for indicating that said command signal has been received.

22. The invention according to claim 17 including means for indicating when a predetermined portion of said groups have been used by the extraction therefrom of said random numbers.

* * * * *